United States Patent [19]
Showalter

[11] Patent Number: 5,833,566
[45] Date of Patent: Nov. 10, 1998

[54] SPEED REDUCTION ASSEMBLY WITH FULL DISCONNECT FOR TRANSFER CASES AND THE LIKE

[75] Inventor: Dan J. Showalter, Plymouth, Mich.

[73] Assignee: Borg-Warner Automotive, Inc., Sterling Heights, Mich.

[21] Appl. No.: 858,333

[22] Filed: May 19, 1997

[51] Int. Cl.$^6$ .................................................. F16H 37/08
[52] U.S. Cl. ......................... 475/198; 475/204; 180/247
[58] Field of Search ................... 475/198, 201, 475/202, 204, 205; 180/247, 248, 249, 250

[56] References Cited

U.S. PATENT DOCUMENTS

| | | | |
|---|---|---|---|
| 4,854,413 | 8/1989 | Kameda et al. | 180/247 |
| 5,078,660 | 1/1992 | Williams et al. | 475/84 |
| 5,106,351 | 4/1992 | Williams et al. | 475/250 |
| 5,271,479 | 12/1993 | Kuwahara et al. | 180/249 |
| 5,330,030 | 7/1994 | Eastman et al. | 180/233 |
| 5,380,255 | 1/1995 | Brissenden et al. | 475/204 |
| 5,409,429 | 4/1995 | Showalter et al. | 475/295 |
| 5,411,110 | 5/1995 | Wilson et al. | 180/247 |
| 5,443,426 | 8/1995 | Forst | 180/248 X |
| 5,609,540 | 3/1997 | Brissenden et al. | 475/202 |
| 5,643,129 | 7/1997 | Richardsin | 475/204 |
| 5,662,543 | 9/1997 | Forsyth | 475/198 |

*Primary Examiner*—Dirk Wright
*Assistant Examiner*—Peter T. Kwon
*Attorney, Agent, or Firm*—Greg Dziegielewski; Brinks, Hofer, Gilson & Lione

[57] ABSTRACT

A two speed planetary gear assembly and double disconnect mechanism for a motor vehicle transfer case or similar device achieves full decoupling of the speed reduction assembly from the power path when either neutral or the high speed gear ratio, typically direct drive, is selected. The double disconnect mechanism includes an axially slidable clutch collar freely rotatably disposed within a correspondingly movable reduction hub which may selectively be translated to engage either a direct drive member or an input to a planetary gear assembly. When the reduction hub is positioned to engage the input of the planetary gear assembly, a gear set on the carrier of the planetary gear assembly engages the reduction hub which drives it and the output member at reduced speed.

20 Claims, 4 Drawing Sheets

5,833,566

SPEED REDUCTION ASSEMBLY WITH FULL DISCONNECT FOR TRANSFER CASES AND THE LIKE

BACKGROUND OF THE INVENTION

The invention relates generally to motor vehicle transfer cases and more specifically to a transfer case wherein a two speed planetary gear assembly which provides direct (high gear) and reduced (low gear) speed operation fully disconnects from the drive line in high gear and neutral.

The performance advantages of four-wheel vehicle drive systems are well recognized. Improved vehicle stability while traversing rain soaked or ice or snow covered highways, handling and control on gravel or uneven pavement and simply maintaining traction in off road situations are all readily acknowledged benefits. Concomitant and less desirable attributes of four-wheel drive systems relate to reduced gas mileage from increased drive line friction, increased noise and vibration and increased vehicle weight. Such increased drive line friction occurs in four-wheel drive systems which continuously drive both the front and rear vehicle propshafts. Increases in noise and vibration are the result of significant increases in, for example, the additional number of mechanical components such as meshing gears, clutches, locking hubs, bearings and rotating shafts. Such vehicle weight increases are also the direct result of added drive line componentry.

Weight and gas mileage penalties are particularly pronounced if the system is designed with a differential between the front and rear drive shafts for full-time engagement and operation rather than intermittent operation when conditions specifically demand it. Furthermore, while part-time four-wheel drive systems which lock the front and rear propshafts together provide obvious benefits of traction and stability in straight line driving, the disparity between the ground speeds of the front wheels and the rear wheels of a vehicle during cornering can itself result in wheel slip and hopping of the vehicle. Thus, allowing the front and rear output shafts of the transfer case to operate at different speeds during cornering is beneficial.

Many four-wheel drive systems employing diverse control, clutch, gearing and torque distribution components have been designed and utilized. These various approaches are embodied in United States patents.

For example, U.S. Pat. No. 4,718,303 teaches a transfer case for a four-wheel drive vehicle having an electromagnetic clutch which controls an associated center, planetary differential. In U.S. Pat. Nos. 5,330,030 and 5,409,429 an electromagnetic clutch is combined with a planetary gear speed reducing assembly to provide both selective torque transfer to a secondary drive line and multiple speed range operation.

Transfer cases also include center differentials which distribute drive torque and accommodate wheel speed differences. Such a device is disclosed in U.S. Pat. Nos. 5,106,351 and 5,271,479.

In transfer cases having speed reduction devices, it is common practice to drive the speed reduction device, typically a planetary gear assembly, from the input shaft of the transfer case. Hence, the planetary gear assembly is always in operation, whether it is actually active in the drive line and transferring torque or not. Such constant operation can be a source of noise, particularly at higher operating speeds. The present invention addresses this problem and provides a practical and unique solution to it.

SUMMARY OF THE INVENTION

A two speed planetary gear speed reduction assembly and double disconnect mechanism for a motor vehicle transfer case or similar device achieves full decoupling of the speed reduction assembly from the power path when either neutral or the high speed gear ratio, typically direct drive, is selected. The double disconnect mechanism includes an axially slidable clutch collar freely rotatably disposed within a correspondingly movable reduction hub which may selectively be translated to engage either a direct drive member or an input to a planetary gear assembly having a sun gear, a ring gear and a plurality of planet gears disposed therebetween and rotatably mounted in a carrier. When the reduction hub is positioned to engage the input of the planetary gear assembly, a gear set on the carrier of the planetary gear assembly engages the reduction hub which drives it and the output member at reduced speed.

DESCRIPTION OF THE PREFERRED AND ALTERNATE EMBODIMENT

Figure 1:
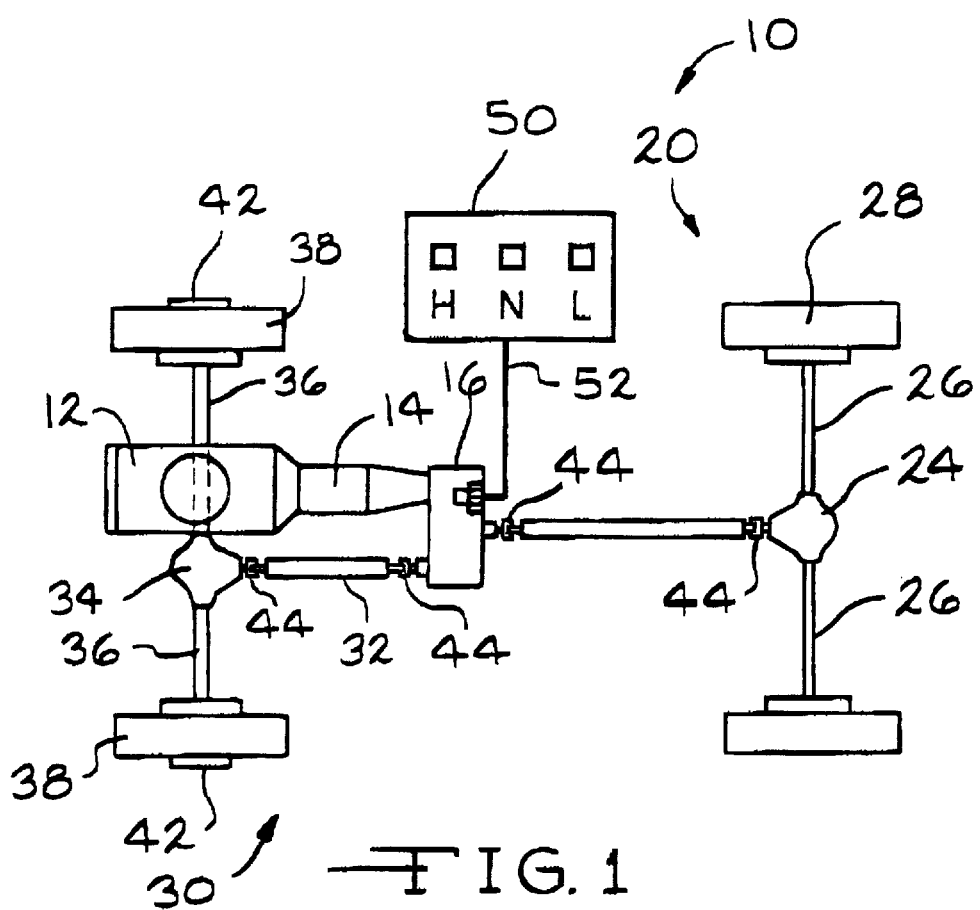
FIG. 1 is a diagrammatic view of a motor vehicle power train having a transfer case which incorporates the present invention.

Referring now to FIG. 1, a four-wheel vehicle drive train is diagrammatically illustrated and designated by the reference number 10. The four-wheel vehicle drive train 10 includes a prime mover 12 which is coupled to and directly drives a conventional manual or automatic transmission 14. The output of the transmission 14 directly drives a transfer case assembly 16 which provides motive power to a primary or rear drive line 20 comprising a primary or rear propshaft 22, a primary or rear differential 24, a pair of live primary or rear axles 26 and a respective pair of primary or rear tire and wheel assemblies 28.

The transfer case assembly 16 also provides motive power to a secondary or front drive line 30 comprising a secondary or front propshaft 32, a secondary or front differential assembly 34, a pair of live secondary or front axles 36 and a respective pair of secondary or front tire and wheel assemblies 38. The front tire and wheel assemblies 38 may be directly coupled to a respective one of the front axles 36 or, if desired, a pair of manually or remotely activatable locking hubs 42 may be operably disposed between each of the front axles 36 and a respective one of the tire and wheel assemblies 38 to selectively interconnect same. Finally, both the primary drive line 20 and the secondary drive line 30 may include suitable and appropriately disposed universal joints 44 which function in conventional fashion to allow static and dynamic offsets and misalignment between the various shafts and components.

A controller 50 disposed within the cabin of the vehicle adjacent the driver includes, for example, a switch or a plurality of push buttons which allow the driver to select and command operation of the transfer case assembly 16 in high, neutral or low in accordance with conventional practice.

Such commands are communicated to the transfer case assembly 16 through a multiple conductor cable 52 which may also provide feedback signals to the controller 50.

The foregoing and following description relates to a vehicle wherein the rear drive line 20 functions as the primary drive line, i.e., it is engaged and operates all the time and, correspondingly, the front drive line 30 functions as the secondary drive line, i.e., it is engaged and may operate only part-time, in a secondary or supplemental fashion, if the locking hubs 42 are utilized, such a vehicle commonly being referred to as a rear wheel drive vehicle or the front drive line 30 may be engaged and operate all the time, in which case the vehicle is referred to as a full time four-wheel drive vehicle.

The designations "primary" and "secondary" are utilized herein primarily to differentiate between the two drive lines of a typical vehicle having a transfer case assembly 16 and, secondarily, to refer to drive lines providing drive torque at all times and drive lines providing supplemental or intermittent torque, respectively. Finally, these designations are utilized herein rather than "front" and "rear" inasmuch as the invention herein disclosed and claimed may be readily utilized with vehicles wherein the primary drive line 20 is disposed at the front of the vehicle and the secondary drive line 30 is disposed at the rear of the vehicle.

It should also be understood that the present invention may also be utilized in transfer cases for part-time four-wheel drive systems which do not utilize a center differential but instead utilize a modulating clutch which selectively transfers torque from a primary drive line to a secondary drive line.

Figure 2:
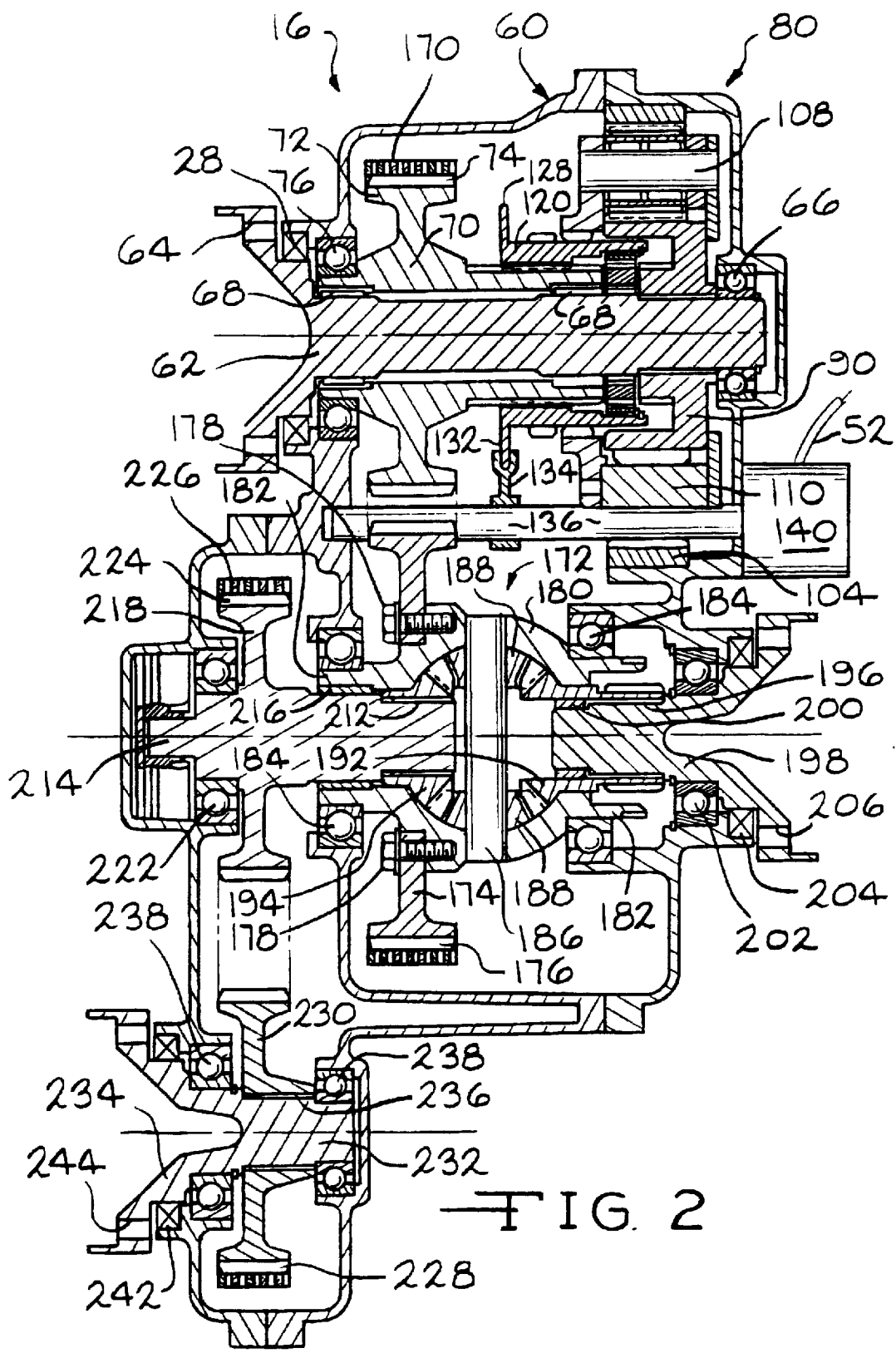
FIG. 2 is a full, sectional view of a transfer case incorporating the present invention.

Referring now to FIG. 2, the transfer case assembly 16 according to the present invention includes a multiple piece housing assembly 60 having a plurality of planar sealing surfaces, openings for shafts and bearings and various recesses, shoulders, counterbores and the like to receive various components or assemblies of the transfer case assembly 16. An input shaft 62 includes a flange 64 or other suitable coupling such as a male or female spline set (not illustrated) which drivingly couples the output of the transmission 14 illustrated in FIG. 1 to the input shaft 62. The input shaft 62 is supported at its end opposite the input flange 64 by an anti-friction bearing such as the ball bearing assembly 66 and at its center and end adjacent the flange 64 by anti-friction bearings such as the roller bearing assemblies 68. The roller bearing assemblies 68 rotatably position and support an output sleeve 70. The output sleeve 70 preferably includes a chain drive sprocket 72 having a plurality of chain drive teeth 74.

The output sleeve 70, in turn, is supported by an anti-friction bearing such as a second ball bearing assembly 76. A suitable oil seal 78 disposed between the flange 64 and the housing assembly 60 provides an appropriate, fluid tight seal therebetween.

Figure 3:
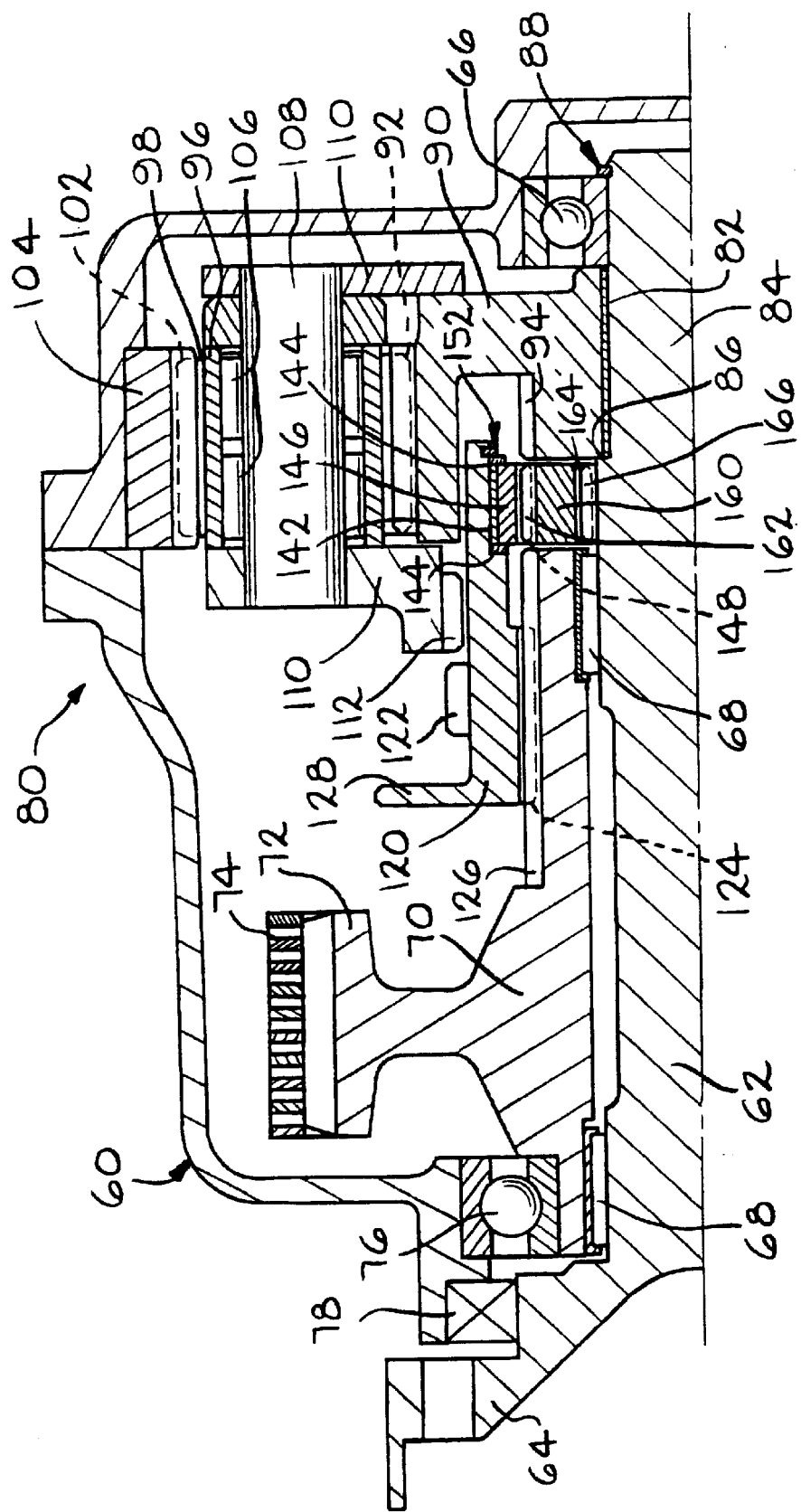
FIG. 3 is a fragmentary, sectional view of a transfer case and planetary gear assembly incorporating the present invention.

Referring now to FIGS. 2 and 3, the transfer case assembly 16 also includes a two-speed planetary drive assembly 80 which is disposed about the input shaft 62 and which includes a full or double disconnect mechanism according to the present invention. The planetary drive assembly 80 includes a journal or sleeve bearing 82 which is freely rotatably received upon a reduced diameter portion 84 of the input shaft 62 and axially retained by a shoulder 86 on the input shaft 62 and the ball bearing assembly 66 which is, in turn, retained by a cooperating snap ring and circumferential groove assembly 88. Freely rotatably disposed upon the sleeve bearing 82 and similarly axially restrained by the ball bearing assembly 66 and the shoulder 86 is a sun gear assembly 90. The sun gear assembly 90 includes male or external gear teeth which constitute a sun gear 92 as well as a radially inwardly disposed set of male or external splines or gear teeth 94 which define a drive gear. A plurality of pinion or planet gears 96 having external gear teeth 98 are in constant mesh with the sun gear 92 as well as the female or internal gear teeth 102 of a ring gear 104 which is seated and secured within the housing assembly 60. Each of the pinion or planet gears 96 includes a roller bearing assembly 106 which, in turn, receives a stub shaft 108 which is secured within a planet carrier 110. The planet carrier 110 includes a set of female or internal splines or gear teeth 112 generally adjacent the output sleeve 70.

Disposed radially inwardly from the planetary drive assembly 80 is a reduction sleeve or hub 120. The reduction hub 120 includes male or external splines or gear teeth 122 which are complementary to and engageable with the female splines or gear teeth 112 on the planet carrier 110. The reduction hub 120 also includes a plurality of female or internal splines or gear teeth 124 which are complementary to and engage a set of male or external splines or gear teeth 126 on the output sleeve 70. The reduction hub 120 is thus free to translate axially over a limited distance relative to the output sleeve 70 while rotating therewith.

As illustrated in FIGS. 2 and 3, the reduction hub 120 includes a radially extending flange 128 which is received within a complementarily configured groove 132 of a shift fork 134. The shift fork 134 may be either directly attached to a shift rod or rail 136 as illustrated or resiliently interconnected thereto by one or a pair of opposed compression springs (not illustrated) which allow energy storage and controlled, spring-biased motion of the shift fork 134 relative to the shift rail 136. The shift rail 136 is movable among one of three defined positions: the position illustrated in FIGS. 2 and 3, neutral, wherein no drive torque is transferred from the input shaft 62 to the output sleeve 70, a position to the right, illustrated in FIG. 4, which corresponds to a lower, reduced speed drive achieved by the planetary drive assembly 80 and the high position, to the left, as illustrated in FIG. 5, corresponding to direct drive from the input shaft 62 to the output sleeve 70. The shift rail 136 is translated between such high, neutral and low positions by a shift operator 140 which may be an electric, pneumatic or hydraulic multiple position operator which preferably includes a feedback sensor (not illustrated) which provides information regarding the position of the shift rail 136 and associated components to the controller 50.

Returning now to FIG. 3, the reduction hub 120 also includes an annular journal bearing insert 142 having a pair of thrust washers 144 aligned with opposite ends thereof. The thrust washers 144 also axially restrain a clutch collar 146 having a plurality of female or internal splines or gear teeth 148 which are in all respects identical to the splines or gear teeth 124 on the reduction hub 120 and complementary to the male splines or gear teeth 94 on the sun gear assembly 90 and the splines or gear teeth 126 on the output sleeve 70. The bearing insert 142, the thrust washers 144 and the clutch collar 146 are all retained by a complementary snap ring and circumferential groove assembly 152 disposed in the reduction hub 120. Though axially restrained, the clutch collar 146 is freely rotatably disposed within the reduction hub 120.

Finally, the planetary gear assembly 80 preferably includes a drive hub or collar 160 which includes male or external splines or gear teeth 162 which are in all respects identical to the male or external splines or gear teeth 94 on the sun gear assembly 90 and the male or external splines or gear teeth 126 on the output sleeve 70 and are complementary to the female or internal splines or gear teeth 148 on the clutch collar 146. The drive collar 160 also includes female or internal splines or gear teeth 164 which are in constant mesh with complementarily configured male or external splines or gear teeth 166 on the input shaft 62. In this regard, it should be understood that the drive collar 160 merely transmits drive torque radially outwardly from the input shaft 62 to the clutch collar 146 and that the drive collar 160 is utilized primarily for purposes of assembly convenience. Hence, from the standpoints of function and operation, the drive collar 166 could and may be integrally formed with or secured to the input shaft 62, thereby eliminating the interengaging splines or gear teeth 164 and 166.

It will thus be appreciated that the drive collar 160 is in full mesh with and constantly driven by the splines or gear teeth 166 on the input shaft 62. Similarly, although the reduction hub 120 can move both to the right and left from the position illustrated in FIGS. 2 and 3, the female splines or gear teeth 148 on the clutch collar 146 are always at least partially laterally engaged with the male splines or gear teeth 162 on the drive collar 160.

Referring again to FIG. 2, the chain drive sprocket 72 receives a complementarily configured first drive chain 170 which transfers drive torque from the output sleeve 70 to a center differential assembly 172. The center differential assembly 172 includes a circular driven chain sprocket 174 having suitably configured chain teeth 176. The circular chain sprocket 174 is secured by a plurality of suitable threaded fasteners such as bolts 178 to a generally spherical differential housing 180. The differential housing 180 includes opposed cylindrical extensions 182 which define the axis of rotation of the differential housing 180 and are freely rotatably supported by a pair of anti-friction bearings such as the ball bearing assemblies 184. The differential housing 180 receives and supports an epicyclic gear train having a center stub shaft 186 which is secured to the differential housing 180 and freely rotatably receives a pair of bevel gears 188. The bevel gears 188 are in constant meshing engagement with a first output gear 192 and a second output gear 194.

The first output gear 192 defines a hollow interior and includes female or internal splines or gear teeth of a first spline or gear set 196, the complementary male or external splines or gear teeth being disposed on a first output flange 198. The output flange 198 is aligned and supported by a collar 200 and freely rotatably supported by an anti-friction bearing such as the ball bearing assembly 202. A suitable oil seal 204 is disposed between the output flange 198 and the housing assembly 60. The output flange 198 preferably forms a portion of a universal joint 44 or includes apertures 206 which facilitate its connection to a secondary drive shaft 32 or similar device.

Similarly, the second output gear 194 defines a hollow interior and includes female or internal splines or gear teeth of a second spline or gear set 212, the complementary male or external splines or gear teeth being disposed on a stub shaft 214. The stub shaft 214 is freely rotatably supported by a journal bearing collar 216 and forms a portion of a chain drive sprocket 218. The chain drive sprocket 218 is freely rotatably supported upon an anti-friction bearing such as the ball bearing assembly 222 and includes suitable chain drive teeth 224 which engage and drive a second drive chain 226. The second drive chain 226 is received upon suitable teeth 228 on a driven chain sprocket 230. The driven chain sprocket 230 is rotationally coupled to a stub shaft 232 having an output flange 234 by a complementarily configured male and female set of splines or gear teeth 236. The stub shaft 232 and the output flange 234 are freely rotatably supported by a pair of anti-friction bearings such as the ball bearing assemblies 238 and an oil seal 242 is disposed between the output flange 234 and the housing assembly 60. The output flange 234 preferably forms a portion of a universal joint 44 or includes apertures 244 which facilitate its connection to a secondary drive shaft 32 or similar device.

It will be appreciated that the differential assembly 172 which is mechanically disposed between the outputs of the transfer case assembly 16 to the primary drive line 20 and the secondary drive line 30 functions as a substantially conventional epicyclic gear train to accommodate distinct rates of rotation between the primary propshaft 22 and the secondary propshaft 32 as those familiar with such devices will readily appreciate.

Figure 4:
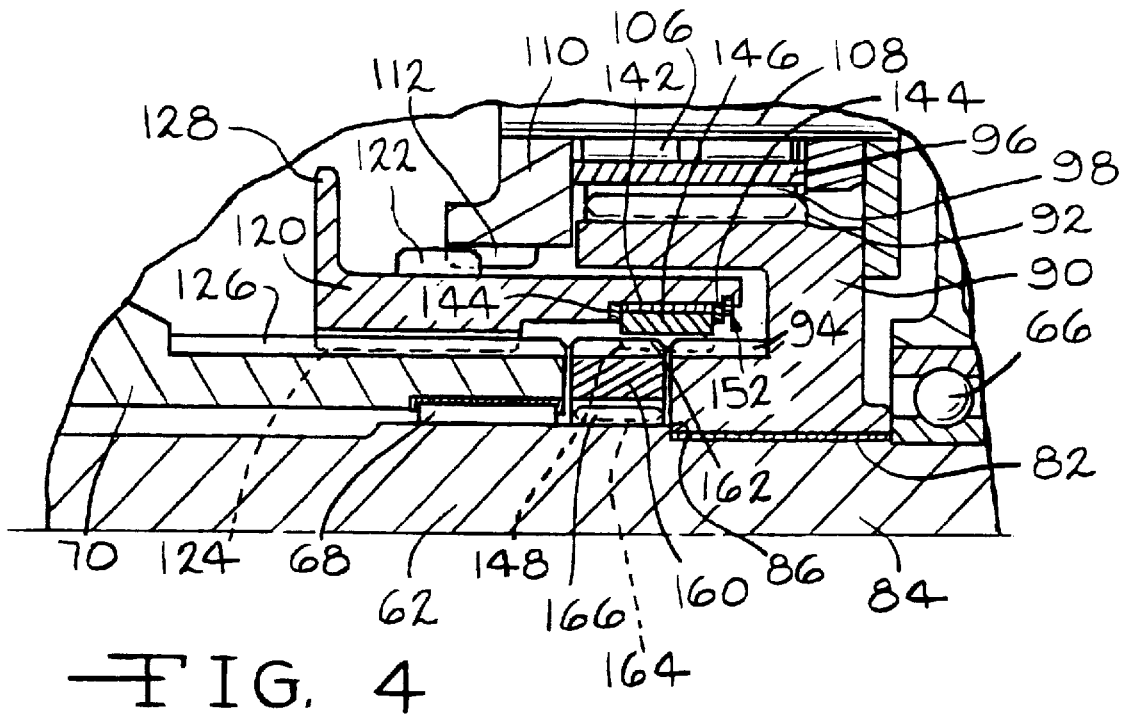
FIG. 4 is an enlarged, fragmentary, sectional view of a shift and disconnect assembly according to the present invention in reduced speed drive or low gear.
Figure 5:
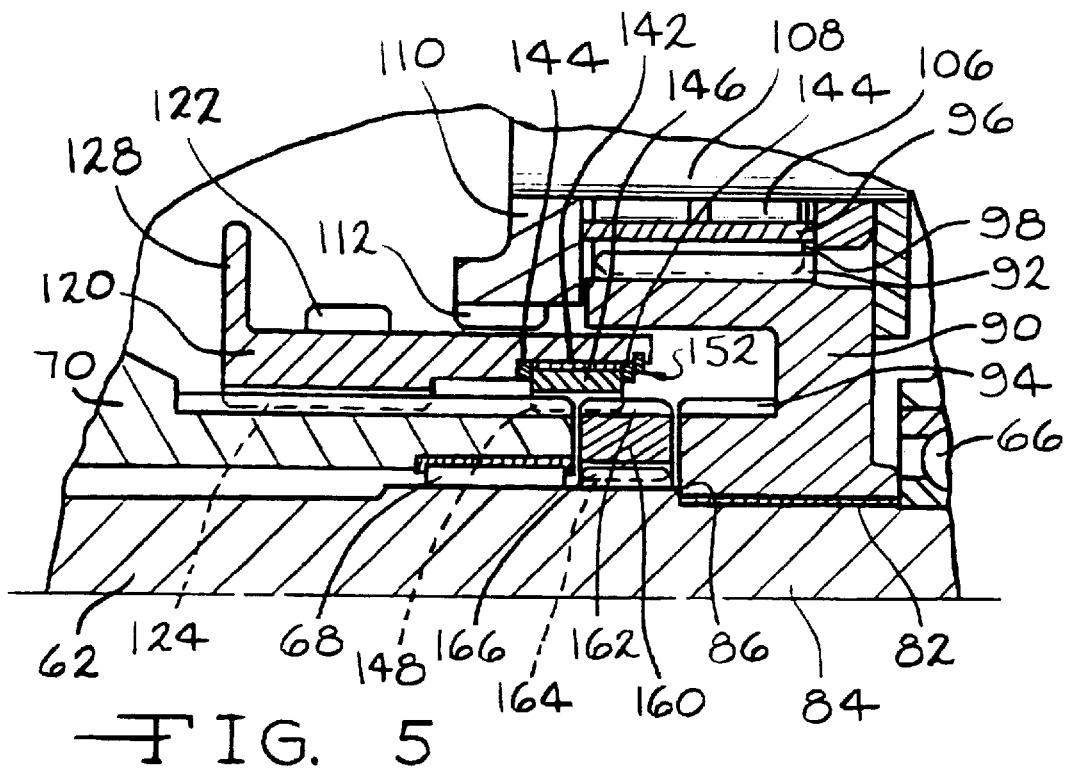
FIG. 5 is an enlarged, fragmentary, sectional view of a shift and disconnect assembly according to the present invention in direct drive or high gear.

Referring now to FIGS. 3, 4 and 5, the operation of the two-speed planetary drive assembly 80 will be described. As noted above, the axial position of the reduction hub 120 determines the operational state of the planetary drive assembly 80. In FIG. 3, the reduction hub 120 is illustrated in its center, neutral position. As illustrated in FIG. 4, a shift to low gear or reduced speed drive has been undertaken by activation of the shift operator 140 which translated the reduction hub 120 and the associated clutch collar 146 to the right such that the clutch collar 146 straddles, i.e., simultaneously engages, both the male splines or gear teeth 162 on the drive collar 160 and the male splines or gear teeth 94 on the sun gear assembly 90. So disposed, the male splines or gear teeth 122 on the reduction hub 120 engage the female splines or gear teeth 112 on the planet carrier 110. Thus, drive torque is transferred from the input shaft 62, through the drive collar 160, through the clutch collar 146, to the sun gear assembly 90, through the sun gear 92 and the pinion or planet gears 96, to the planet carrier 110, through the reduction hub 120 and, finally, to the output sleeve 70 and the first chain 170 to the differential assembly 172.

When the reduction hub 120 is axially translated one position to the left and returns to the position illustrated in FIG. 3, it will be appreciated that all drive torque and rotational energy to the planetary drive assembly 80 are removed and that the planetary drive assembly 80 is substantially quiescent, being driven only by residual frictional forces from the input shaft 62, through the sleeve bearing 82 and thence to the sun gear assembly 90.

Referring now to FIG. 5, translation of the reduction hub 120 to the left from the position illustrated in FIG. 3 causes the clutch collar 146 to straddle the male splines or gear teeth 162 on the drive collar 160 and the male splines or gear teeth 126 on the output sleeve 70 resulting in direct, i.e., high speed, drive through these components to the drive chain 170 and the differential assembly 172. It should be noted that in this position, as well, the planetary drive assembly 80 is fully disconnected from the drive line, is substantially quiescent and therefore significantly enhances quiet operation of the transfer case assembly 16.

Although illustrated in conjunction with a motor vehicle transfer case, it should be appreciated that the full disconnect speed reduction assembly of the present invention will have broad application in devices and products where reduced noise, frictional energy loss and component wear are significant design considerations.

The foregoing disclosure is the best mode devised by the inventor for practicing this invention. It is apparent, however, that apparatus incorporating modifications and variations will be obvious to one skilled in the art of motor vehicle drive lines and transfer cases. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A planetary drive assembly providing two distinct drive ratios comprising, in combination, a first member having gear teeth disposed thereon, a planetary gear assembly having a sun gear assembly freely rotatably disposed on said first member, said sun gear assembly including a first, sun gear and a second, interior gear disposed adjacent said gear teeth on said first member, a ring gear, a plurality of planet gears meshing with said first, sun gear and said ring gear and a planet carrier for rotatably receiving said planet gears, said carrier including teeth, a second member freely rotatably disposed about said first member and having teeth disposed adjacent said teeth on said first member, and a reduction hub axially slidably disposed on said second member and having first teeth complementary to said teeth on said carrier, and second teeth complementary to said teeth on said second member for rotationally engaging said second member, said reduction hub further including a clutch collar having teeth complementary to said teeth on said first member, said second, interior gear of said sun gear assembly and said teeth on said second member, said clutch collar disposed for rotation relative to and axial translation with said reduction hub.

2. The planetary drive assembly of claim 1 whereby axial translation of said reduction hub and said clutch collar selectively engages direct drive through said clutch collar and said second member and reduced speed drive through said clutch collar, said second, interior gear, said first, sun gear, said plurality of planet gears, said planet carrier, said reduction hub and said second member.

3. The planetary drive assembly of claim 2 wherein said planetary gear assembly is quiescent when direct drive is selected by said clutch collar.

4. The planetary drive assembly of claim 1 wherein said first member is an input and said second member is an output and includes a chain drive sprocket.

5. The planetary drive assembly of claim 1 wherein said second member includes a chain drive sprocket, a chain, a driven chain sprocket and a differential assembly coupled to said driven chain sprocket and having a pair of outputs adapted to drive a pair of vehicle drive lines.

6. The planetary drive assembly of claim 1 further including a journal sleeve disposed between said clutch collar and said reduction hub and between said first member and said sun gear assembly.

7. The planetary drive assembly of claim 1 further including a pair of roller bearings disposed between said first member and said second member.

8. The planetary drive assembly of claim 1 further including a flange on said reduction hub, a shift fork engaging said flange, a shift rail and an operator for translating said rail between at least two positions.

9. A drive assembly providing two distinct drive ratios comprising, in combination, a first member having teeth disposed thereon, an assembly having a gear member freely rotatably disposed on said first member, said gear member including teeth disposed adjacent said teeth on said first member, a speed reducing assembly operably associated with said gear member and having an output having teeth, a second member freely rotatably disposed about said first member and having teeth disposed adjacent said teeth on said first member, and a hub axially slidably disposed on said second member and having first teeth for engaging said teeth on said output, second teeth for rotationally engaging said teeth on said second member and a collar disposed for rotation relative to and axial translation with said hub, said collar having teeth complementary to said teeth on said first member, said teeth on said gear member and said teeth on said second member.

10. The drive assembly of claim 9 wherein axial translation of said hub and said collar selectively provides direct drive through said collar and said second member and reduced speed drive through said collar, said gear member, said speed reducing assembly, said teeth of said output, said first teeth of said hub and said second member.

11. The drive assembly of claim 9 wherein said first member is an input and said second member is an output and includes a chain drive sprocket.

12. The drive assembly of claim 9 further including a flange on said hub, a shift fork engaging said flange, a shift rail coupled to said shift fork and an operator for translating said shift rail.

13. The drive assembly of claim 9 further including a bearing sleeve disposed between said collar and said hub, a pair of thrust washers disposed adjacent each end of said collar and a retaining ring seated in said hub.

14. The drive assembly of claim 9 wherein said second member includes a chain drive sprocket, a chain, a driven chain sprocket and a differential assembly coupled to said driven chain sprocket and having a pair of outputs adapted to drive a pair of vehicle drive lines.

15. The drive assembly of claim 9 wherein said speed reducing assembly transfers drive torque only when said collar engages said teeth on said gear member.

16. The drive assembly of claim 9 wherein said first member includes a drive collar having internal and external teeth and said internal teeth engage said teeth on said first member.

17. A transfer case having a planetary assembly providing two distinct drive ratios comprising, in combination, an input member having gear teeth disposed thereon, a planetary gear assembly having a sun gear assembly freely rotatably disposed on said input member, said sun gear assembly including a first, sun gear and a second, interior gear disposed adjacent said gear teeth on said first member, a ring gear, a plurality of planet gears meshing with said first, sun gear and said ring gear and a planet carrier for rotatably receiving said planet gears, said carrier including teeth, an output member freely rotatably disposed about said input member and having teeth disposed adjacent said teeth on said input member, said second member including a chain drive sprocket, a hub axially slidably disposed on said output member and having first teeth complementary to said teeth on said carrier, second teeth complementary to said teeth on said output member for rotationally engaging said second member, said reduction hub further including a collar having teeth complementary to said teeth on said input member, said second, interior gear of said sun gear assembly and said teeth on said output member, said collar disposed for free rotation relative to and axial translation with said hub, a driven chain sprocket and chain disposed on said chain sprockets, and a differential assembly coupled to said driven chain sprocket and having a pair of outputs adapted to a pair of vehicle drive lines.

18. The transfer case of claim 17 further including a second chain drive sprocket coupled to one of said outputs of said differential assembly, a second driven chain sprocket, a second chain disposed on said second chain sprockets and an output member driven by said second driven chain sprocket.

19. The transfer case of claim 17 further including a flange on said hub, a shift fork engaging said flange, a shift rail and an operator for translating said shift rail between at least two positions.

20. The transfer case of claim 19 further including switch means for commanding movement of said operator.

* * * * *